(12) United States Patent
Guan et al.

(10) Patent No.: US 11,368,205 B2
(45) Date of Patent: Jun. 21, 2022

(54) BEAM RECOVERY METHOD AND APPARATUS

(71) Applicant: HUAWEI TECHNOLOGIES CO., LTD., Shenzhen (CN)

(72) Inventors: Peng Guan, Chengdu (CN); Xiaoyong Tang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 2 days.

(21) Appl. No.: 17/002,581

(22) Filed: Aug. 25, 2020

(65) Prior Publication Data

US 2020/0389223 A1 Dec. 10, 2020

Related U.S. Application Data

(63) Continuation of application No. PCT/CN2019/082137, filed on Apr. 10, 2019.

(30) Foreign Application Priority Data

Apr. 13, 2018 (CN) .......................... 201810333555.6

(51) Int. Cl.
H04B 7/06 (2006.01)
H04B 7/08 (2006.01)
(Continued)

(52) U.S. Cl.
CPC .......... H04B 7/0695 (2013.01); H04B 7/088 (2013.01); H04W 72/046 (2013.01); H04W 76/18 (2018.02); H04W 76/19 (2018.02)

(58) Field of Classification Search
CPC .. H04B 7/0695; H04B 7/088; H04B 7/15528; H04W 72/046; H04W 76/18;
(Continued)

(56) References Cited

U.S. PATENT DOCUMENTS

2016/0183143 A1 6/2016 Park et al.
2018/0006770 A1 1/2018 Guo et al.
(Continued)

FOREIGN PATENT DOCUMENTS

CN 102484513 A 5/2012
CN 103875191 A 6/2014
(Continued)

OTHER PUBLICATIONS

CATT,"Considerations on beam recovery mechanism",3GPP TSG RAN WG1 Meeting #88 ,R1-1702078, Athens, Greece Feb. 13-17, 2017, total 4 pages.
(Continued)

Primary Examiner — Harry H Kim
(74) Attorney, Agent, or Firm — Stein IP, LLC

(57) ABSTRACT

A beam recovery method and apparatus such that the method includes: communicating, by a relay node, with a network device by using a serving beam; after a serving beam failure is detected, further monitoring the serving beam and determining whether the serving beam is recovered; and if the serving beam is recovered, further communicating, by the relay node, with the network device by using the serving beam. According to the beam recovery method, a waste of resources is reduced during beam recovery, and a time for beam recovery is further shortened.

16 Claims, 3 Drawing Sheets

(51) Int. Cl.
*H04W 72/04* (2009.01)
*H04W 76/18* (2018.01)
*H04W 76/19* (2018.01)
*H04W 36/30* (2009.01)
*H04B 7/155* (2006.01)
*H04W 36/06* (2009.01)
*H04W 72/08* (2009.01)

(58) Field of Classification Search
CPC ... H04W 76/19; H04W 36/305; H04W 36/06; H04W 72/085
See application file for complete search history.

(56) References Cited

U.S. PATENT DOCUMENTS

| | | | |
|---|---|---|---|
| 2018/0351627 A1* | 12/2018 | Nilsson | H04L 5/0051 |
| 2019/0124696 A1* | 4/2019 | Islam | H04B 7/269 |
| 2019/0132852 A1* | 5/2019 | Petersson | H04B 7/0634 |
| 2021/0058797 A1* | 2/2021 | Yoshioka | H04W 48/16 |
| 2021/0058913 A1* | 2/2021 | Jang | H04B 7/088 |
| 2021/0092625 A1* | 3/2021 | Wang | H04B 7/0632 |
| 2021/0099222 A1* | 4/2021 | Hwang | H04B 7/086 |
| 2021/0307061 A1* | 9/2021 | Huang | H04W 74/006 |

FOREIGN PATENT DOCUMENTS

| | | |
|---|---|---|
| CN | 107079459 A | 8/2017 |
| WO | 2018027904 A1 | 2/2018 |

OTHER PUBLICATIONS

3GPP TS 38.133 V15.1.0 (Mar. 2018),3rd Generation Partnership Project;Technical Specification Group Radio Access Network;NR; Requirements for support of radio resource management(Release 15), total 59 pages.

Huawei et al,"Beam Failure Recovery Design Details",3GPP TSG RAN WG1 Meeting AH NR#3, R1-1715468, Nagoya, Japan, 18-21, Sep. 2017, total 10 pages.

3GPP TS 38.213 V15.1.0 (Mar. 2018),3rd Generation Partnership Project;Technical Specification Group Radio Access Network;NR;Physical layer procedures for control(Release 15), total 77 pages.

Huawei et al,"Relationship between beam failure recovery and RLF", 3GPP TSG RAN WG1 NR Ad Hoc Meeting, R1-1711402, Qingdao, China, Jun. 27-30, 2017, total 4 pages.

3GPP TS 38.214 V15.1.0 (Mar. 2018),3rd Generation Partnership Project;Technical Specification Group Radio Access Network;NR;Physical layer procedures for data (Release 15), total 77 pages.

MCC Support, Draft Report of 3GPP TSG RAN WG1 #90 v0.2.0(Prague, Czech Rep, Aug. 21 25, 2017), 3GPP TSG RAN WG1 Meeting AH_NR#3, Nagoya, Japan, Sep. 18 21, 2017, R1-1715351, 57 pages.

Samsung, Recovery mechanisms for beam failure scenarios. 3GPP TSG RAN WG1 Meeting #88, Athens, Greece, Feb. 13-17, 2017, R1-1702938, 3 pages.

* cited by examiner

BEAM RECOVERY METHOD AND APPARATUS

CROSS-REFERENCE TO RELATED APPLICATIONS

This application is a continuation of International Application No. PCT/CN2019/082137, filed on Apr. 10, 2019, which claims priority to Chinese Patent Application No. 201810333555.6, filed on Apr. 13, 2018, the disclosures of the aforementioned applications are hereby incorporated by reference in their entireties.

TECHNICAL FIELD

Aspects of this application relate to the field of communications technologies, and in particular, to a beam recovery method and apparatus.

BACKGROUND

To meet a requirement for large-capacity and high-rate transmission in a mobile communications system, a high frequency band greater than 6 GHz is introduced for communication for using a high-bandwidth and high-rate transmission characteristic of the high frequency band, which is one of the hottest research technologies in a fifth generation (5G) communications system.

Beam-based communication can bring a higher antenna gain, especially in a high-frequency communication environment, and is an important tool for overcoming rapid attenuation of a high-frequency signal. However, the beam-based communication is easily blocked, causing signal interruption. Therefore, a beam failure recovery mechanism is necessary.

A beam failure recovery procedure performed between a base station and a terminal is specified in an existing protocol, and the foregoing beam failure recovery procedure between the base station and the terminal may also be used between a base station and a relay node. Beam management needs to be performed again for the beam recovery procedure, causing a waste of resources, and further, a relatively long time for recovery.

SUMMARY

Aspects of this application provide a beam recovery method and apparatus, to reduce resource waste in a beam recovery procedure.

According to one aspect, a beam recovery method is disclosed, including: communicating, by a relay node, with a network device by using a serving beam; after a serving beam failure is detected, further monitoring the serving beam and determining whether the serving beam is recovered; and if the serving beam is recovered, further communicating, by the relay node, with the network device by using the serving beam.

With reference to the foregoing solution, after the serving beam failure is detected, the method further includes: starting a beam failure recovery procedure; and after the original serving beam is recovered, terminating, by the relay node, the beam failure recovery procedure.

In other words, after the beam failure, the relay node starts the beam failure recovery procedure, but continues to monitor a status of the original serving beam. If the original serving beam is recovered in a timely manner, the original serving beam is still used for communication, and the beam failure recovery procedure is terminated, thereby reducing a waste of resources, and further, shortening a time for beam recovery.

In a case, the starting a beam failure recovery procedure includes: enabling a timer and/or a counter for the beam failure recovery procedure; and may further include: determining a new available beam from a candidate beam set, configuring an uplink resource, and the like. The terminating, by the relay node, the beam failure recovery procedure includes: disabling or resetting the timer and/or the counter for the beam failure recovery procedure; and may further include releasing the configured uplink resource.

In the foregoing case, if the original serving beam has been recovered before the relay node sends a beam failure recovery request to the network device, the original serving beam is directly used, and the beam failure recovery procedure is terminated.

In addition, if the uplink resource has been configured in the beam failure recovery procedure, the configured uplink resource further needs to be released when the beam recovery procedure is terminated, and an uplink signal is not sent on the uplink resource.

In another case, the starting a beam failure recovery procedure includes: determining a new available beam from a candidate beam set, and sending a beam failure recovery request to the network device; and may further include: receiving a response of the network device to the beam failure recovery request. The terminating, by the relay node, the beam failure recovery procedure includes: sending, by the relay node, a beam failure recovery rollback message to the network device; and receiving a response of the network device to the beam failure recovery rollback message.

In the foregoing case, because the relay node has sent the beam failure recovery request, and the original serving beam is recovered, beam failure recovery rollback needs to be performed. To be specific, the network device is notified not to use a new available beam, and to continue to use the original serving beam.

With reference to the foregoing solutions, the determining whether the serving beam is recovered includes: determining whether quality of the serving beam is better than a specified condition and/or whether the quality of the serving beam is better than quality of the new available beam.

The foregoing solution is also applicable to beam recovery between a terminal device and a network device, provided that the relay node is replaced with the terminal device.

Corresponding to the foregoing method, a beam recovery apparatus is further disclosed, including:

a communications module, configured to communicate with a network device by using a serving beam; and a processing module, configured to: after a serving beam failure is detected, further monitor the serving beam, and determine whether the serving beam is recovered, where the communications module is further configured to: if the serving beam is recovered, further communicate with the network device by using the serving beam.

In the foregoing apparatus, if the processing module determines that the original serving beam is recovered, the communications module continues to communicate with the network device by using the original serving beam. Functions of the foregoing two modules may also be integrated into one module for implementation.

With reference to the foregoing apparatus, the processing module is further configured to: after the serving beam failure is detected, start a beam failure recovery procedure; and after the serving beam is recovered, terminate the beam failure recovery procedure.

With reference to the foregoing apparatus, the processing module is further configured to: enable a timer and/or a counter for the beam failure recovery procedure; and disable or reset the timer and/or the counter for the beam failure recovery procedure.

With reference to the foregoing apparatus, the apparatus further includes: a sending module, configured to: send a beam failure recovery request to the network device; and send a beam failure recovery rollback message to the network device; and a receiving module, configured to receive a response of the network device to the beam failure recovery rollback message; and further configured to receive a response of the network device to the beam failure recovery request.

The sending module and the receiving module may also be implemented by using a transceiver module.

With reference to the foregoing apparatus, the processing module is further configured to determine whether quality of the serving beam is better than a specified condition and/or whether the quality of the serving beam is better than quality of the new available beam. Further, the processing module is further configured to determine the new available beam from a candidate beam set.

The foregoing apparatus may be a relay node or a terminal device, or may be a chip, an integrated circuit, or a functional unit in the relay node or the terminal device, and the foregoing module may alternatively be a unit.

The foregoing apparatus has a function of implementing corresponding steps performed by the relay node in the foregoing method. The function may be implemented by hardware, or may be implemented by hardware executing corresponding software. The hardware or software includes one or more modules corresponding to the foregoing functions. For example, the sending module may be replaced with a transmitter, the receiving module may be replaced with a receiver, another module such as the processing module may be replaced with a processor, and the communications module may be a baseband processor, which separately performs a sending operation, a receiving operation, and related processing and communication operations, in the method embodiments.

The transmitter and the receiver may alternatively be transceivers, and the processor and the baseband processor may also be integrated together.

According to another aspect of this application, a computer program product including an instruction is provided, and when the computer program product runs on a computer, the computer is enabled to perform the method according to the foregoing aspects.

According to still another aspect of this application, a communications chip is provided, where the communications chip stores an instruction, and when the instruction is run on a network device or a terminal device, a computer is enabled to perform the method according to the foregoing aspects.

According to yet another aspect of this application, a computer-readable storage medium is provided. The computer-readable storage medium stores an instruction, and when the instruction is run on a computer, the computer is enabled to perform the method according to the foregoing aspects.

BRIEF DESCRIPTION OF DRAWINGS

To describe the technical solutions in the embodiments of this application more clearly, the following briefly describes the accompanying drawings used for describing the embodiments or the prior art.

DESCRIPTION OF EMBODIMENTS

Figure 1:
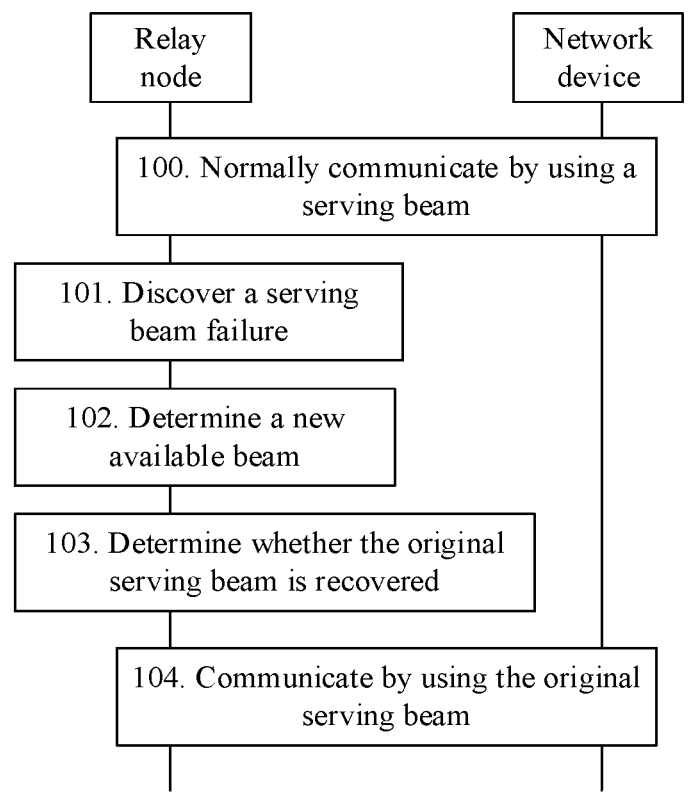
FIG. 1 is a flowchart of a beam recovery method according to an embodiment of this application.

The terminal device (terminal for short) in the embodiments of this application may be an access terminal, a subscriber unit, a subscriber station, a mobile station, a mobile console, a remote station, a remote terminal, a mobile device, a user terminal, a wireless communications device, a user agent, or a user apparatus. The access terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal in a 5G network, or the like.

The network device in the embodiments of this application is a network side device that performs wireless communication with the terminal device, for example, a wireless-fidelity (Wi-Fi) access point, a next-generation communications base station such as a 5G gNB, a small cell, or a micro base station, a transmission reception point (TRP); or may be a relay station, an access point, a vehicle-mounted device, a wearable device, or the like.

In a relay network, a node that provides a service for a lower-level node is referred to as a donor node. In 5G new radio (NR), the donor may be a base station, or may be a relay node (RN). A base station in a 5G network may be referred to as a next generation node B (gNB), or may be denoted as a donor gNB (DgNB). The relay node may also be referred to as a relay transmission and reception point (rTRP).

For example, if the network device is a base station, a beam failure recovery procedure between the base station and the terminal mainly includes four processes.

1. The Terminal Detects a Beam Failure.

Beam failure detection is performed based on a beam failure detection reference signal (BFD RS). A physical layer of the terminal periodically detects the BFD RS sent by a base station. If the BFD RS meets a condition of a beam failure instance, for example, beam quality is lower than a specified beam failure quality threshold, a beam failure instance indication is sent to a higher layer of the terminal. If a beam failure instance occurs for N consecutive times, a beam failure is announced at the higher layer of the terminal, where N is a specified value.

2. The Terminal Detects a New Available Beam.

The higher layer of the terminal requires the physical layer of the terminal to send, to the higher layer of the terminal, a candidate beam that meets a condition, for example, beam quality is higher than a given candidate beam quality threshold. A candidate beam set is configured by the base station for the terminal. The higher layer is another layer other than the physical layer, and there may be one or more candidate beams.

3. The Terminal Sends a Beam Failure Recovery Request (BFRQ) to the Base Station.

The higher layer of the terminal selects one of the candidate beams that meet the condition as a new available beam (marked as q_new), and notifies the physical layer of the terminal of a random access channel (RACH) resource associated with the new available beam. The physical layer of the terminal sends the BFRQ to the base station on the RACH resource by using the new available beam (q_new).

4. The Terminal Receives a Response of the Base Station to the BFRQ.

For example, the reception starts from the fourth slot after the BFRQ is sent (n+4), where n indicates a slot in which the BFRQ is sent, 4 is an example, and there may be another value. The terminal monitors a dedicated control channel resource set (control resource set, CORESET) and a search space (search space) corresponding to the dedicated control channel resource set by using the q_new, to obtain the response of the base station to the BFRQ. The response may be delivered through a downlink control channel (for example, a physical downlink control channel, PDCCH), and if the response is received, it indicates that beam recovery is successful.

The foregoing procedure is also applicable to a beam failure recovery procedure between the base station and the relay node, provided that the terminal is replaced with the relay node. The relay node may be a relay station, or may be another relay device. The higher layer may be a media access control (MAC) layer.

When beam communication is performed between the base station and the relay node, because locations of the base station and the relay node are relatively fixed, and a signal transmission path is mostly a line of sight (line of sight, LOS) path, beam-based communication between the base station and the relay node may have one or more of the following characteristics.

1. Beam failures are mainly caused by moving obstacles. After the obstacles are removed, a serving beam is recovered.

2. Quality of the serving beam is far better than quality of the candidate beam.

3. For communication between the base station and the relay node, downlink resources may be insufficient due to impact of a frame structure.

When the foregoing beam failure recovery method used between the base station and the terminal is used between the base station and the relay node, one or more of the following problems may be caused.

1. Recover communication by using a new candidate beam whose quality is far worse than that of the original serving beam.

2. After communication is recovered by using a candidate beam, beam management needs to be performed again, resulting in a waste of resources.

3. After the base station sends the BFRQ to the relay node, a time for receiving the response may be relatively long, resulting in a long time for beam recovery.

To resolve the foregoing one or more problems, an embodiment of this application provides a beam recovery method. After a beam failure recovery procedure is enabled, an original serving beam continues to be monitored. If the original serving beam is recovered, the original serving beam continues to be used for communication. Referring to FIG. 1, the method includes the following steps.

100: In an initial state, a base station normally communicates with a relay node.

The base station and the relay node communicate with each other by using one or more beams. One or more of the following information may be configured between the base station and the relay node, including:

a serving beam set, for example, one or more serving beams may be configured for each CORESET, and the serving beam set may include serving beams of a plurality of CORESETs;

a beam failure determining condition, including one or more of a beam failure detection threshold (a threshold 1), a counter/timer (a counter/timer 1) for a beam failure instance, and the like;

a candidate beam set, for example, a set including one or more reference signal resources (for example: CSI-RS resource), or one or more synchronization signal block indices (SSB index); and generally, one beam corresponds to one CSI-RS (channel state information-reference signal, channel state information-reference signal) or SSB (synchronization signal block, synchronization signal block);

a threshold of an available beam, including one or more of an available beam detection threshold (a threshold 2), a counter/timer (a counter/timer 2) for available beam detection, and the like;

an association relationship between a candidate beam and an uplink transmission resource;

a determining condition for serving beam failure recovery, including one or more of a threshold (a threshold 3) for serving beam failure recovery detection, a counter/timer (a counter/timer 3) for serving beam failure recovery detection, and the like; and a beam failure recovery timer (a timer 4) is required because the overall beam failure recovery procedure needs to be limited within a specific time. A maximum quantity of times for which the beam failure recovery request can be retransmitted is limited, so that a counter (a counter 4) for beam failure recovery request retransmission is required.

One or more of the foregoing information may be configured by the base station and notified to the relay node, or may be defined in a standard and preconfigured by the base station and the relay node.

101: The relay node monitors the serving beam, and discovers a serving beam failure.

Specifically, a condition for determining the serving beam failure by the relay node may include:

If quality of the serving beam is worse than a specified degree, for example, worse than a preset quality threshold, the threshold 1 may be used.

For example, the threshold 1 is a control channel bit error rate, and may be a hypothetical PDCCH BLER (block error rate). In this case, if the relay node determines, in a time interval, that the quality of the serving beam is higher than the threshold 1 (because the BLER is a bit error rate, and a higher BLER indicates poorer quality), the counter 1 counts one beam failure instance. Alternatively, the threshold 1 is a receive power, for example, a L1-RSRP (layer 1 reference signal received power, layer 1 reference signal received power). In this case, if the relay node determines, in a time interval, that the quality of the serving beam is lower than the threshold 1 (because the L1-RSRP refers to signal strength, and a lower RSRP indicates poorer quality), a beam failure instance is counted once. When the counter 1 counts N1 consecutive beam failure instances (the value of N1 may be preset), the relay node may determine a serving beam failure.

The foregoing thresholds are examples, and are defined in a standard. However, the thresholds are not limited to the foregoing two types, provided that the threshold can reflect the beam quality.

In a layer model, because a physical layer and a higher layer have different execution functions, the following tasks can be divided:

The beam failure instance may be determined by the physical layer of the relay node and notified to the higher layer of the relay node.

The higher layer of the relay node executes the counter 1, and when a condition in which N1 consecutive times are counted is met, the higher layer announces a beam failure.

After the beam failure is detected, the timer 4 and/or the counter 4 may be enabled.

102: The relay node determines a new available beam from the candidate beam set.

Specifically, a condition for determining the new available beam by the relay node may include the following.

Quality of the candidate beam is better than a specified degree. For example, the quality is better than a preset quality threshold, so that the threshold 2 mentioned above may be used, which is similar to the threshold 1, and the threshold 2 may be a hypothetical PDCCH BLER. Alternatively, the threshold 2 is a L1-RSRP. When the quality of the candidate beam is lower than a specified BLER threshold or higher than a specified RSRP threshold, the relay node considers that the quality of the candidate beam meets the condition.

When the quality of the candidate beam is better than the specified threshold for N2 consecutive times (which is counted by the counter 2, and a value of N2 may be preset), the relay node considers that the candidate beam may be used as the new available beam.

In a layer model, because the physical layer and the higher layer have different execution functions, the following tasks can be divided:

After an announcement of the beam failure described in step 101, the higher layer of the relay node requests a candidate beam from the physical layer.

The physical layer of the relay node performs a measurement function, and reports a candidate beam identifier and candidate beam quality to the higher layer.

The higher layer of the relay node selects one of one or more possible candidate beams as the new available beam.

The higher layer of the relay node notifies the physical layer of the new available beam and/or an uplink resource (for example, a RACH resource, or a PUCCH resource).

103: The relay node continues to monitor the original serving beam, and determines whether the original serving beam is recovered.

After the beam failure in step 101, the relay node needs to continue to monitor the original serving beam. For example, the relay node periodically performs a monitoring behavior.

If the original serving beam has been recovered and step 102 has been performed, the relay node autonomously terminates the beam failure recovery procedure, which includes one or more of the following:

releasing, by the relay node, the uplink resource configured in step 102, and skipping sending an uplink signal on the uplink resource;

restarting monitoring, by the relay node, the serving beam as described in step 101;

disabling or resetting, by the relay node, the timer 4 and/or the counter 4 for the overall beam failure recovery procedure as described in step 100;

feeding back, by the relay node, a newly discovered available beam and quality of the beam to the base station; and if the original serving beam has been recovered and step 102 has not been performed, disabling or resetting, by the relay node, the timer 4 and the counter 4 for the overall beam failure recovery procedure as described in step 100, and generally, the timer is disabled and the counter is reset.

A determining condition for determining the original serving beam failure recovery by the relay node is similar to that for detecting the serving beam, and may include:

If the quality of the original serving beam is better than a specified degree, for example, better than a specified quality threshold, the threshold 3 may be used. Similar to the threshold 1, for example, the threshold 3 may be a hypothetical PDCCH BLER. Alternatively, the threshold 3 is a L1-RSRP. That the quality of the original serving beam is higher than a specified degree means that the quality of the original serving beam is lower than a specified BLER or higher than a specified RSRP.

Alternatively, the quality of the original serving beam is better than quality of the new available beam selected in step 102. For example, the L1-RSRP of the original serving beam is higher than the L1-RSRP of the new available beam selected in step 102. Alternatively, the hypothetical PDCCH BLER of the original serving beam is lower than the hypothetical PDCCH BLER of the new available beam selected in step 102.

The foregoing two determining conditions for the quality of the original serving beam may both be met, or only one condition may be met.

When the quality of the original serving beam is higher than the specified threshold for N3 consecutive times (which is counted by the counter 3, and N3 is a specified value), the relay node considers that the original serving beam is recovered after a failure.

Steps 102 and 103 may be performed in any sequence, and both steps may also be performed concurrently.

104: The relay node and the base station continue to perform normal communication by using the original serving beam.

Figure 2:
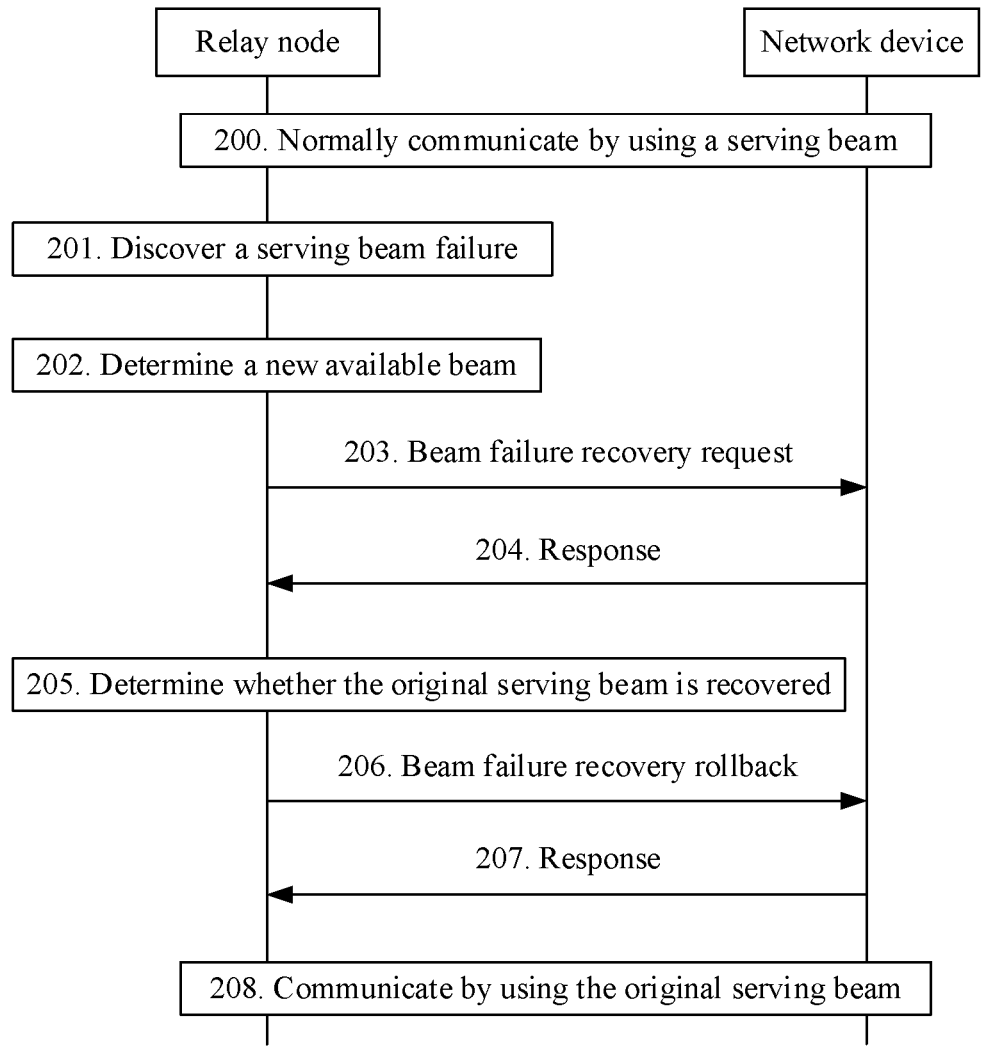
FIG. 2 is a flowchart of a beam recovery method according to another embodiment of this application.

In the foregoing solution, in the process of starting beam recovery, before the relay node sends the beam failure recovery request (BFRQ) to the base station, if the original serving beam has been recovered, the relay node continues to communicate with the base station by using the original serving beam. In another embodiment, if the original serving beam is recovered only after the relay node sends the beam failure recovery request (BFRQ) to the base station, beam failure recovery rollback needs to be performed, and the original serving beam continues to be used. Referring to FIG. 2, the method includes the following steps.

Steps 200 to 202 are the same as steps 100 to 102. Details are not described again.

203: The relay node sends a beam failure recovery request (BFRQ) to the base station.

The relay node may send the BFRQ by using a transmit beam corresponding to the new available beam selected in step 202. The BFRQ may be a RACH sequence, or the BFRQ may be sent through an uplink control channel, for example, a PUCCH (physical uplink control channel, physical uplink control channel).

The relay node may implicitly notify, by using the RACH sequence, the base station of the new available beam, because there is an association relationship between the preconfigured RACH and a candidate beam.

The relay node may explicitly notify, through the PUCCH, the base station of the new available beam, and may report a PUCCH format of a normal beam, for example, report in a format of indicating a beam identifier and beam quality.

204: The base station responds to the BFRQ, and the relay node monitors the response of the base station to the BFRQ.

After an X1 time after the BFRQ is sent in step 203, the relay node starts to receive the response of the base station to the BFRQ on the new available beam selected in step 202. The response may be sent through a downlink control channel. For example, the response is a PDCCH message. If the relay node can receive the PDCCH message on the new available beam, it indicates that the beam failure recovery procedure has succeeded, and the relay node may continue to communicate with the base station by using the new available beam. X1 may be 4, n is a slot for sending the BFRQ, and the relay node monitors the PDCCH in a (n+4) slot.

The relay node monitors the response of the base station to the BFRQ in a time window 1. If the relay node still does not receive the response when the time window 1 expires, the relay node may resend the BFRQ. For example, another candidate beam is used for the sending, or a higher transmit power is used for the sending.

If no response of the base station is received for a plurality of times of resending, the relay node may consider that the beam failure recovery procedure fails, where the quantity of times of resending may be preset.

The beam failure recovery timer (the timer 4) is required for timing because the overall beam failure recovery procedure needs to be limited within a specific time. A maximum quantity of times for which the beam failure recovery request can be retransmitted is limited, so that the counter (the counter 4) for counting times of the beam failure recovery request retransmission is required.

205: The relay node continues to monitor the original serving beam, and determines whether the original serving beam is recovered.

After the beam failure, the relay node continuously monitors the original serving beam. The original serving beam can be used again because an obstacle may have been removed.

For a condition in which the relay node determines whether the original serving beam is available, refer to the description in step 103. Details are not described again.

Steps 204 and 205 may be performed in any sequence, and both steps may also be performed concurrently. The relay node may continue to monitor the original serving beam after a beam failure is detected.

206: The relay node sends a beam failure recovery rollback message to the base station.

Based on a determining result in step 205, if the original serving beam has been recovered, because the relay node has sent the BFRQ to the base station, rollback of the new beam needs to be performed, to indicate that the new available beam is no longer used, and the original serving beam is used.

The relay node sends the beam failure recovery rollback message to the base station, to indicate that the original serving beam has been recovered, and the beam failure recovery procedure does not need to be performed again. The message may be sent by using the recovered original serving beam, or may be sent by using the new available beam determined in step 202. The sent beam failure recovery rollback message may be a RACH sequence, or may be sent through an uplink control channel or an uplink data channel, for example, through a PUCCH.

The RACH sequence may be a special sequence, and the base station may configure a dedicated RACH as the beam failure recovery rollback message. Alternatively, the RACH sequence may be a normal sequence, and needs to be additionally specified in a protocol. When the base station detects that information is sent on a RACH resource associated with an original serving beam, it is considered that a previous beam failure recovery request (BFRQ) of the relay node is invalid.

When sending is performed through the PUCCH, a special PUCCH format may be reported, and the base station may configure a dedicated PUCCH format as the beam failure recovery fallback message. A PUCCH format of a normal beam may also be reported. In other words, a plurality of beam identifiers (ID) and quality of each beam are indicated. It should be stipulated in a protocol that, after receiving the BFRQ, if the base station detects an original serving beam ID reported by the relay node (and beam quality of the original serving beam meets a condition for communication), the base station considers the BFRQ invalid.

When the base station receives the beam failure recovery rollback message, if the base station has not sent the response to the BFRQ, the base station may stop sending the response to the BFRQ.

In one case, if the new available beam of the relay node is already available for successful communication in step 204, the new available beam may also be used for feeding back the beam failure recovery fallback message.

207: The base station sends a beam failure recovery rollback message response to the relay node, and the relay node monitors the response of the base station to the rollback message.

After an X2 time (which may be configured by the base station or defined in a protocol) after the fallback message is sent in step 206, the relay node may receive the response of the base station on the original serving beam, or may receive the response by using the new available beam determined in step 202. The response may be sent through a downlink control channel. For example, the response is a PDCCH message. If the relay node receives the PDCCH message, it indicates that the fallback message has successfully arrived at the base station, and the relay node may continue to communicate with the base station by using the original serving beam.

The relay node monitors the response of the base station to the rollback message in a time window 2 (which may be configured by the base station or defined in a protocol). If the relay node still does not receive the response when the time window 2 expires, the relay node may resend the rollback message. For example, another candidate beam is used for the sending, or a higher transmit power is used for the sending.

If no response of the base station is received for a plurality of times of resending, the relay node may consider that the current beam rollback fails, where the quantity of times of resending may be preset.

A beam failure recovery timer (a timer 5) is required for timing because the overall rollback procedure needs to be limited within a specific time. A maximum quantity of times for which the beam failure recovery rollback message can be retransmitted is limited, so that the counter (the counter 5)

for counting times of the rollback is required. The timer and the counter may also be configured in configuration information in step 100 or 200.

Optionally, the response to the rollback message may be a PDCCH message in a special format, or the response may be a PDCCH message in a normal format, but a dedicated control channel resource set (control resource set) is configured and/or a dedicated search space (search space) is configured. The relay node may receive the response of the base station to the rollback message on the dedicated control channel resource set and/or the search space.

In addition, if the relay node successfully receives the response of the base station to the BFRQ and the response of the base station to the rollback message, the relay node needs to preferentially consider a rollback mechanism, that is, preferentially communicate with the base station by using the original serving beam.

208: The relay node communicates with the base station by using the original serving beam.

In the foregoing embodiment, in the beam recovery procedure, because the relay node has sent the BFRQ, and the original serving beam is recovered with relatively good quality, the beam failure recovery rollback needs to be performed, and the new available beam is not used, and then the original serving beam is still used for communication.

The solutions in the foregoing embodiments are also applicable to beam recovery between a network device and a terminal device, provided that the relay node is replaced with the terminal device.

Figure 3:
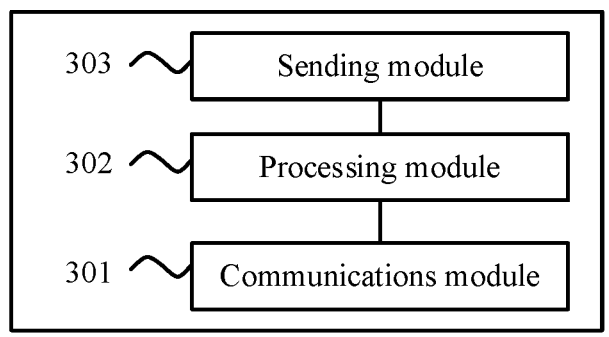
FIG. 3 is a schematic diagram of a beam recovery apparatus according to an embodiment of this application.

An embodiment of this application further discloses the relay device or the terminal device in the foregoing method embodiment. Referring to FIG. 3, one or more of the following modules: a communications module, a processing module, a sending module, and a receiving module are included.

The network device and the terminal device completely correspond to the network device or the relay device in the method embodiment, and a corresponding step is performed by a corresponding module. For example, the sending module performs the sending step in the method embodiment, the receiving module performs the receiving step in the method embodiment, the communications module performs a communication function, and the processing module may perform other steps. For functions of a specific module, refer to corresponding method embodiment as shown in FIG. 3, for example:

a beam recovery apparatus, including:

a communications module 301, configured to communicate with a network device by using a serving beam; and a processing module 302, configured to: after a serving beam failure is detected, further monitor the serving beam, and determine whether the serving beam is recovered.

The communications module 301 is further configured to: if the serving beam is recovered, further communicate with the network device by using the serving beam.

The processing module 302 is further configured to: determine whether the original serving beam is recovered; and further, after the serving beam failure is detected, start a beam failure recovery procedure; and after the serving beam is recovered, terminate the beam failure recovery procedure.

The processing module 302 is further configured to enable, disable or reset a timer and/or a counter for the beam failure recovery procedure.

The processing module 302 is further configured to determine a new available beam from a candidate beam set.

The processing module 302 is further configured to determine whether quality of the serving beam is better than a specified condition and/or whether the quality of the serving beam is better than quality of the new available beam.

The beam recovery apparatus further includes: a sending module 303, configured to: send a beam failure recovery request to the network device; and send a beam failure recovery rollback message to the network device; and a receiving module (not shown in the figure), configured to receive a response of the network device to the beam failure recovery rollback message; and receive a response of the network device to the beam failure recovery request.

The foregoing modules may also be integrated. For example, the sending module 303 and the receiving module are integrated into a transceiver module, and the processing module 302 and the communications module 301 are integrated into a processing module, to jointly implement communication and processing functions.

Correspondingly, the network device in the method embodiment is further disclosed. A related method can be referred to, and a corresponding function can be implemented by a corresponding module.

There is also another form of embodiment for the network device and the terminal device in the apparatus embodiments corresponding to the foregoing methods. The sending module 303 may be replaced with a transmitter, the receiving module may be replaced with a receiver, another module such as a processing module may be replaced with a processor, and the communications module may be replaced with a baseband processor or a baseband chip, which separately performs a sending operation, a receiving operation, related processing and communication operations, and the like in the method embodiments. The transmitter and the receiver may form a transceiver.

Figure 4:
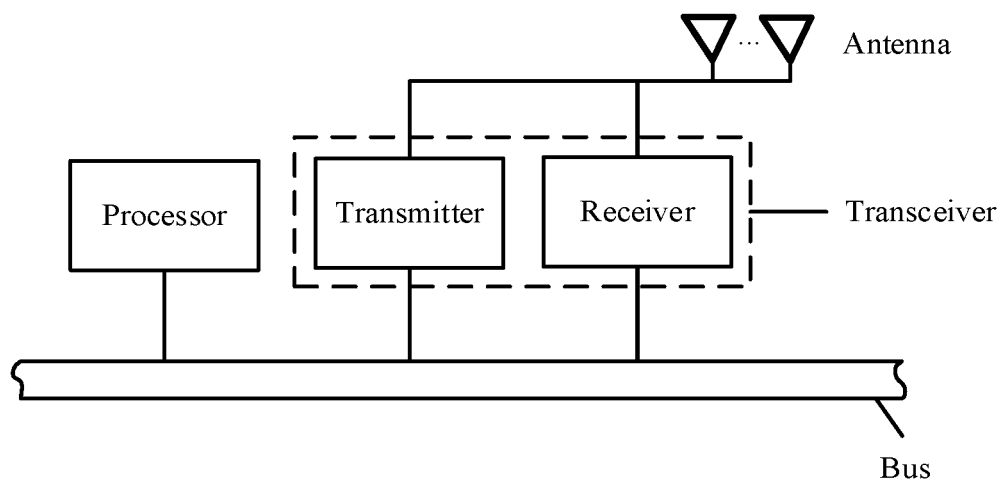
FIG. 4 is a schematic diagram of a beam recovery apparatus according to another embodiment of this application.

For a specific structure of the apparatus embodiment in another form, refer to FIG. 4. The processor may be a general purpose processor, a digital signal processor, an application-specific integrated circuit, a field programmable gate array, or another programmable logic device. There may be one or more processors, which jointly implement processing and communication functions.

A transmitter and a receiver may form a transceiver. An antenna may further be included, and there may be one or more antennas.

In addition, a memory may further be included, and is configured to store related information such as a program or code. The memory may be an independent component, or may be integrated into the processor.

The foregoing components may be coupled together by using a bus. In addition to a data bus, the bus further includes a power supply bus, a control bus, and a status signal bus. However, for clear description, various types of buses in the figure are marked as the bus.

FIG. 4 is only a schematic diagram, and another elements or only some elements may be further included. For example, a transmitter and a receiver are included, or only a transmitter, a receiver, and a processor are included.

The components or some components in FIG. 4 may be integrated into a chip for implementation, for example, integrated into a baseband chip for implementation.

The foregoing apparatuses may be the relay device or the terminal device in the method embodiments, or may be a chip, a functional unit (module), or an integrated circuit in the relay device or the terminal device.

Further, in a specific embodiment, a memory (not shown in the figure) may be further included and is configured to store computer-executable program code. When the program code includes an instruction, and when the processor executes the instruction, the instruction enables the relay device or the terminal device to perform corresponding steps in the method embodiments.

The memory may be an independent physical unit, and may be connected to the processor by using a bus. The memory and the processor may be integrated together, and implemented by using hardware.

The memory is configured to store a program for implementing the foregoing method embodiments or each module in the apparatus embodiments, and the processor invokes the program to perform the operations of the foregoing method embodiments.

Optionally, when some or all of the beam recovery method in the foregoing embodiments are implemented by using software, the apparatus may alternatively include only a processor. The memory configured to store the program is located outside the apparatus. The processor is connected to the memory by using a circuit/wire, and is configured to read and execute the program stored in the memory.

The processor may be a central processing unit (central processing unit, CPU), a network processor (network processor, NP), or a combination of a CPU and an NP.

The processor may further include a hardware chip. The foregoing hardware chip may be an application-specific integrated circuit (application-specific integrated circuit, ASIC), a programmable logic device (programmable logic device, PLD), or a combination thereof. The PLD may be a complex programmable logic device (complex programmable logic device, CPLD), a field programmable logic array (FPGA), a generic array logic (generic array logic, GAL), or any combination thereof.

The memory may include a volatile memory, for example, a random access memory (RAM); or the memory may include a non-volatile memory, for example, a flash memory, a hard disk drive (HDD), or a solid-state drive (SSD); or the memory may include a combination of the foregoing types of memories.

An embodiment of this application further provides a computer storage medium storing a computer program, and the computer program is used to perform the method according to the foregoing embodiment.

An embodiment of this application further provides a computer program product including an instruction, and when the computer program product runs on a computer, the computer is enabled to perform the method according to the foregoing embodiment.

All or some of the foregoing embodiments may be implemented by software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a web site, computer, server, or data center to another web site, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (Solid State Disk, (SSD)), or the like.

In this application, "at least one" means one or more, and "a plurality of" means two or more. The terms "and/or" and "one or more . . . and . . . " describe an association relationship between associated objects and may indicate three relationships. For example, "A and/or B" and "one or more of A and B" may indicate the following cases: only A exists, both A and B exist, and only B exists, where A and B may be singular or plural. The character "/" generally indicates an "or" relationship between the associated objects. "At least one of the following items (pieces)" or a similar expression means any combination of these items, including any combination of singular items (pieces) or plural items (pieces). For example, at least one (one piece) of a, b, or c may indicate: a, b, c, a-b, a-c, b-c, or a-b-c, where a, b, and c may be singular or plural. The network device and the terminal device in the apparatus embodiments corresponding to the foregoing methods have functions of implementing steps performed by the network device and the terminal device in the foregoing method embodiments. The function may be implemented by hardware, or may be implemented by hardware executing corresponding software. The hardware or software includes one or more modules corresponding to the foregoing functions. In other words, corresponding functional modules separately perform steps in the corresponding method embodiments.

What are disclosed above are merely embodiments of this application, and certainly are not intended to limit the protection scope of this application. Therefore, equivalent variations made in accordance with the claims of this application shall fall within the scope of this application.

What is claimed is:

1. A method, comprising:
communicating, by a relay node, with a network device by using a serving beam;
after a serving beam failure of the serving beam is detected,
starting a beam recovery procedure by:
determining a new available beam from a candidate beam set while further monitoring the serving beam to determine whether the serving beam is recovered, and
sending a beam failure recovery request, by the relay node, to the network device in response to determining the new available beam; and
if the serving beam is recovered in response to the monitoring,
terminating the beam recovery procedure, by the relay node, and further communicating, by the relay node, with the network device by using the serving beam.

2. The method according to claim 1, wherein the starting the beam failure recovery procedure comprises:
enabling at least one of a timer or a counter for the beam failure recovery procedure; and
the terminating, by the relay node, the beam failure recovery procedure comprises:
disabling or resetting the at least one of the timer or the counter for the beam failure recovery procedure.

3. The method according to claim 1, wherein
the terminating, by the relay node, the beam failure recovery procedure comprises:
sending, by the relay node, a beam failure recovery rollback message to the network device; and
receiving a response of the network device to the beam failure recovery rollback message.

4. The method according to claim 3, wherein the beam recovery rollback message is sent using the new available beam.

5. The method according to claim 1, wherein the determining whether the serving beam is recovered comprises:
determining at least one of whether quality of the serving beam is better than a specified condition or whether the quality of the serving beam is better than quality of a new available beam.

6. The method according to claim 1, wherein the candidate beam set, is a set including one or more reference signal resources or one or more synchronization signal block indices, wherein one beam corresponds to one CSI-RS (channel state information-reference signal) or SSB (synchronization signal block).

7. The method according to claim 1, wherein:
the determining of the serving beam failure is determined by a physical layer of the relay node, and notified to a higher layer of the relay node;
the higher layer requests the candidate beam set from the physical layer; and
the higher layer selects the new available beam from the candidate beam set.

8. The method according to claim 1, wherein:
the relay node sends the beam failure recovery request using a transmit beam corresponding to the new available beam, the beam failure recovery request being a RACH sequence, and
the relay node notifies, by using the RACH sequence, a base station of the new available beam in view of an association relationship between the preconfigured RACH and a candidate beam.

9. An apparatus, comprising:
a transceiver, configured to communicate with a network device by using a serving beam; and
a processor, configured to: after a serving beam failure of the servicing beam is detected,
start a beam recovery procedure by:
determining a new available beam from a candidate beam set while further monitoring the serving beam to determine whether the serving beam is recovered, and
sending a beam failure recovery request to the network device in response to determining the new available beam; wherein
the transceiver is further configured to: if the processor determines that the serving beam is recovered in response to the monitoring, terminate the beam recovery procedure, and further communicate with the network device by using the serving beam.

10. The apparatus according to claim 9, wherein the processor is further configured to: enable at least one of a timer or a counter for the beam failure recovery procedure; and
disabling or resetting the at least one of the timer or the counter for the beam failure recovery procedure.

11. The apparatus according to claim 9, wherein the transceiver is further configured to:
send a beam failure recovery rollback message to the network device if the serving beam is recovered; and
receive a response of the network device to the beam failure recovery rollback message.

12. The apparatus according to claim 9, wherein the processor is further configured to perform one or more of the following:
determine whether quality of the serving beam is better than a specified condition; and determine whether the quality of the serving beam is better than quality of the new available beam.

13. A non-transitory computer-readable medium having processor-executable instructions stored thereon for saving power for a relay node, the processor-executable instructions when executed by a processor, causes the processor to implement operations including to:
communicate, by a relay node, with a network device by using a serving beam;
after a serving beam failure of the serving beam is detected,
start a beam recovery procedure by:
determining a new available beam from a candidate beam set while further monitor the serving beam to determine whether the serving beam is recovered; and
sending a beam failure recovery request to the network device in response to determining the new available beam; and
if the serving beam is recovered in response to the monitoring, terminate the beam recovery procedure, and further communicate, by the relay node, with the network device by using the serving beam.

14. The non-transitory computer-readable medium according to claim 13, wherein the starting a beam failure recovery procedure comprises:
enabling at least one of a timer or a counter for the beam failure recovery procedure; and
the terminating, by the relay node, the beam failure recovery procedure comprises:
disabling or resetting at least one of the timer or the counter for the beam failure recovery procedure.

15. The non-transitory computer-readable medium according to claim 13, wherein
the terminating, by the relay node, the beam failure recovery procedure comprises:
sending, by the relay node, a beam failure recovery rollback message to the network device; and
receiving a response of the network device to the beam failure recovery rollback message.

16. The non-transitory computer-readable medium according to claim 13, wherein the determining whether the serving beam is recovered comprises:
determining at least one of whether quality of the serving beam is better than a specified condition or whether the quality of the serving beam is better than quality of a new available beam.

* * * * *